Patented Mar. 10, 1925.

1,529,207

UNITED STATES PATENT OFFICE.

WILLIAM G. O'BRIEN, OF AKRON, OHIO, ASSIGNOR TO THE GOODYEAR TIRE & RUBBER COMPANY, OF AKRON, OHIO, A CORPORATION OF OHIO.

PROCESS OF MAKING A RUBBERIZED FIBER COMPOSITION.

No Drawing. Application filed July 31, 1922. Serial No. 578,820.

*To all whom it may concern:*

Be it known that I, WILLIAM G. O'BRIEN, a citizen of the United States, and resident of Akron, Ohio, have invented new and useful Improvements in Processes of Making a Rubberized Fiber Composition, of which the following is a specification.

My invention relates to a method of making a rubberized fiber composition which may be utilized in a variety of capacities such as floor or wall coverings, as a substitute for leather, or for any other purpose to which a tough, flexible, porous, water-resistant composition may be adapted.

The many important objects and advantages of my invention will be apparent from a perusal of the following specification and the attached claims.

By my invention I have provided a simple and economical process of manufacturing a material of this class which consists in adding a quantity of liquid comprising a rubber solvent and a rubber precipitant to a rubber solution in such proportions that the solution becomes a rubber precipitant only after a certain desired quantity of liquid has been added thereto. The fibers may be added at any time prior to the precipitation of the rubber, preferably after only a portion of the liquid has been added. After the solution has become a precipitant and the rubber has been deposited upon the fibers, they are so strained from the solution as to effect a matted formation, which product is then dried and cured in the customary manner.

In practicing my invention I first dissolve a relatively small quantity of rubber in toluol, benzol, or some similar rubber solvent. To this solution I add a quantity of liquid which consists of a mixture of toluol, benzol, gasoline or any rubber solvent, and alcohol, acetone, or some similar miscible rubber precipitant. After a portion of the total quantity of liquid has been added, I add a quantity of fibers. The liquid should be in approximately the proportions of 77% toluol and 23% alcohol, or some similar solution which is a precipitating liquid at normal temperature. The remainder of the toluol alcohol mixture is then slowly added to the rubber solution while being continuously agitated to disperse the fibers in the rubber solution thoroughly throughout the entire mixture. The toluol content of the rubber solution is sufficient to render the entire mixture a solvent until practically the entire quantity of toluol-alcohol mixture has been added.

I have found it highly desirable to have the quantity of fibers and the quantity of rubber employed of substantially the same weight, although the proportions may be varied to effect different results. It is also highly desirable that the quantity of fibers constitute but a relatively small percentage of the total mixture after the addition of the toluol-alcohol mixture. For example, the rubber and the fiber should each preferably constitute from 1% to 2% of the total mixture. The proportions of the toluol-alcohol mixture with respect to the toluol in the original rubber solution should be such that precipitation at normal room temperature does not occur until after substantially the entire quantity of liquid, which it is desired to mix with the rubber solution, has been added. The proper results may be obtained by dissolving approximately 10 grams of rubber in 100 cc. of toluol and mixing therewith 10 grams of fibers. To this solution is then added about 1800 cc. of the 77% toluol 23% alcohol mixture. If it is desired to hasten the precipitation, a small quantity of pure alcohol may be added, but if the toluol-alcohol mixture is properly proportioned, this is not necessary.

After the rubber has been precipitated upon the fibers, they are so strained from the solution as to effect a matted formation which may be accomplished by permitting the fibers, in a very dilute mixture to assume their natural positions as the liquid is drained off slowly. The resulting mat is then washed, dried, and cured in the customary manner. If desired, the mat may be cured and dried simultaneously, or the rubber may be treated with vulcanizing agents while in solution or after precipitation and prior to the drying operation.

In the foregoing description and in the accompanying claims I have referred merely to fibers as being mixed with the rubber solution, and finally having the rubber precipitated thereon. These fibers may consist of wood, hemp, cotton, jute, asbestos, leather, wool or the like, depending on the purpose for which the final product is ultimately to be employed.

Although I have set forth in detail but a single application of my invention, it will be obvious to those skilled in the art, that it is not so limited but that various minor changes and modifications may be made therein without departing from the spirit of my invention, or from the scope of the appended claims.

What I claim is:

1. The method of making a fibrous material which comprises mixing a quantity of fibers in a rubber solution, adding a quantity of liquid thereto comprising a mixture of a rubber solvent and precipitant, straining the fibers from the liquid, forming a mat therefrom, washing, and curing the mat.

2. The method of making a fibrous material which comprises mixing a quantity of fibers in a rubber solution, adding a quantity of liquid thereto comprising a mixture of toluol and alcohol, straining the fibers from the liquid, forming a mat therefrom, washing, and drying the mat.

3. The method of making a fibrous material which comprises mixing a quantity of fibers in a rubber-toluol solution, adding a quantity of liquid thereto comprising a mixture of toluol and alcohol, so straining the fibers from the liquid as to form a mat, washing, drying and curing said mat.

4. The method of making a fibrous material which comprises mixing a relatively small quantity of fibers in a toluol-rubber solution comprising a relatively small quantity of rubber, adding thereto a relatively large quantity of liquid comprising a mixture of toluol and alcohol, so straining the fibers from the liquid as to effect a matted formation, washing, drying and curing the product.

5. The method of making a fibrous material which comprises mixing a relatively small quantity of fibers in a toluol-rubber solution comprising a relatively small quantity of rubber, adding thereto a relatively large quantity of liquid comprising a mixture of toluol and alcohol, the fibers and rubber in the liquid being approximately equal in weight and each being equal to about $\frac{1}{2}$ to 2% of the weight of the liquid, so straining the fibers from the liquid as to effect a matted formation, washing, drying and curing the product.

6. The method of making a fibrous material which comprises adding a quantity of a toluol-alcohol mixture to a solution of rubber, adding and mixing therewith a quantity of fibers, adding an additional amount of the toluol-alcohol mixture, straining the fibers from the liquid, and washing the same.

In witness whereof, I have hereunto signed my name in the presence of two subscribing witnesses.

WILLIAM G. O'BRIEN.

Witnesses:
L. M. HARTMAN,
F. A. LIND.